(12) United States Patent
Shinohara et al.

(10) Patent No.: US 9,259,835 B2
(45) Date of Patent: Feb. 16, 2016

(54) CANTILEVERED ASSEMBLY WORK CONVEYOR DEVICE

(75) Inventors: Masayoshi Shinohara, Tochigi (JP); Kouichi Shibayama, Tochigi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 141 days.

(21) Appl. No.: 14/126,547

(22) PCT Filed: Feb. 23, 2012

(86) PCT No.: PCT/JP2012/054368
§ 371 (c)(1),
(2), (4) Date: Dec. 16, 2013

(87) PCT Pub. No.: WO2013/008488
PCT Pub. Date: Jan. 17, 2013

(65) Prior Publication Data
US 2014/0130345 A1    May 15, 2014

(30) Foreign Application Priority Data

Jul. 14, 2011   (JP) .................................. 2011-155518

(51) Int. Cl.
| | |
|---|---|
| *B25H 1/10* | (2006.01) |
| *B65G 17/16* | (2006.01) |
| *B65G 19/02* | (2006.01) |
| *H01B 13/012* | (2006.01) |
| *B23P 21/00* | (2006.01) |

(52) U.S. Cl.
CPC *B25H 1/10* (2013.01); *B65G 17/16* (2013.01); *B65G 19/02* (2013.01); *H01B 13/01209* (2013.01); *B23P 21/00* (2013.01); *Y10T 29/534* (2015.01); *Y10T 29/53539* (2015.01)

(58) Field of Classification Search
CPC .......... B25H 1/10; B65G 19/02; B23P 21/00; H01B 13/01209; Y10T 29/53539; Y10T 29/534
See application file for complete search history.

(56) References Cited

U.S. PATENT DOCUMENTS

| | | | |
|---|---|---|---|
| 5,526,562 A | 6/1996 | Kita et al. | |
| 6,732,849 B2 * | 5/2004 | Yamamoto ............. | B65G 17/16 198/370.03 |
| 2003/0079958 A1 * | 5/2003 | Yamamoto ............... | 198/370.03 |
| 2009/0294246 A1 * | 12/2009 | Pogue .......................... | 198/313 |

FOREIGN PATENT DOCUMENTS

| | | |
|---|---|---|
| JP | 6-187853 | 7/1994 |
| JP | 6-283057 | 10/1994 |

(Continued)

OTHER PUBLICATIONS

International Search Report, mail date is Mar. 27, 2012.

*Primary Examiner* — Ryan J Walters
(74) *Attorney, Agent, or Firm* — Greenblum & Bernstein, P.L.C.

(57) ABSTRACT

Running over components such as an electrical wire when displacing a work table is inhibited. An assembly work conveyor device includes a plurality of work tables and a displacement support mechanism that includes a displacement driver causing the work tables to displace along an oval displacement path. The plurality of work tables are displaced along the oval displacement path in a state supported in a cantilevered manner by the displacement support mechanism and in a posture projecting toward an outer periphery of the oval displacement path.

7 Claims, 4 Drawing Sheets

(56) References Cited

FOREIGN PATENT DOCUMENTS

| | | |
|---|---|---|
| JP | 8-90456 | 4/1996 |
| JP | 9-312107 | 12/1997 |
| JP | 11-48165 | 2/1999 |
| JP | 2000-288963 | 10/2000 |
| JP | 2000-343456 | 12/2000 |
| JP | 2001-266673 | 9/2001 |
| JP | 2002-329429 | 11/2002 |

* cited by examiner

CANTILEVERED ASSEMBLY WORK CONVEYOR DEVICE

FIELD OF THE INVENTION

The present invention relates to an assembly work conveyor device for assembling a wire harness and the like.

BACKGROUND OF THE INVENTION

Conventionally, a technology disclosed in Patent Literature 1 is given as this kind of wire harness assembly conveyor device.

In Patent Literature 1, casters are attached to four corners of a lower portion of a dolly supporting a drawing board, the casters enabling the dolly to displace over a floor surface. Further, the dolly is circulatingly driven by a chain along an annular path having an oval shape.

RELATED ART

Patent Literature

Patent Literature 1: Japanese Patent Laid-open Publication No. 2000-288963

SUMMARY OF THE INVENTION

Problems to Be Solved by the Invention

However, Patent Literature 1 is a configuration in which the casters on the four corners of the lower portion of the dolly travel over the floor surface. Therefore, the casters of the dolly may run over components (electrical wires, or ends, connectors, and the like of the electrical wires) sagging from the drawing board, or run over components in the area awaiting assembly. When the components are run over, the components may be broken, for example, or smooth displacement of the drawing board may be prevented.

Under these circumstances, the present invention has as an object to inhibit running over a component when displacing a work table.

Means for Solving the Problems

In order to resolve the above-noted problem, a first aspect includes a plurality of work tables and a displacement support mechanism that includes a displacement driver causing the work tables to displace along an oval displacement path. The plurality of work tables are supported in a cantilevered manner by the displacement support mechanism and in a posture projecting toward an outer periphery of the oval displacement path.

A second aspect is the assembly work conveyor device according to the first aspect, in which the displacement driver includes an endless looped member driven to circulatingly rotate along the oval displacement path, and in which the plurality of work tables are connected to the endless looped member and are thereby driven to displace along the oval displacement path.

A third aspect is the assembly work conveyor device according to the first or second aspect, in which the plurality of work tables include a displacement support projecting toward the inner periphery of the oval displacement path, and in which the displacement support mechanism further includes a displacement guide member supporting the displacement support in a manner capable of displacing along the oval displacement path.

A fourth aspect is the assembly work conveyor device according to any one of the first to third aspects, in which a traveling portion capable of traveling while supporting a weight of the work table is provided on a bottom portion of each of the plurality of work tables on an inner peripheral side of the oval displacement path.

A fifth aspect is the assembly work conveyor device according to the fourth aspect, in which the displacement support mechanism is provided along the oval displacement path and further includes a travel support at a position above a floor surface, the travel support supporting the traveling portion in a manner capable of displacement.

A sixth aspect is the assembly work conveyor device according to any one of the first to fifth aspects, in which the assembly work conveyor device further includes an operation panel fixated on the inner peripheral side of the oval displacement path and above a top end position of the plurality of work tables.

A seventh aspect is the assembly work conveyor device according to any one of the first to sixth aspects, in which a part chock is provided to at least one of the plurality of work tables, the part chock extending further than an end portion of the work table on an outer peripheral side of the oval displacement path and inhibiting a component supplied for assembly work on the work table from infiltrating below the work table.

Effect of the Invention

According to the assembly work conveyor device according to the first aspect, the plurality of work tables are supported by the displacement support mechanism in a cantilevered manner in a posture projecting toward the outer periphery of the oval displacement path. Therefore, running over a component when displacing the work tables can be inhibited.

According to the second aspect, the plurality of work tables can be circulatingly displaced along the oval displacement path by a circulating rotation drive of the endless looped member.

According to the third aspect, the displacement supports projecting toward the inner periphery of the oval displacement path from the plurality of work tables are supported by the displacement guide member in a manner capable of displacement along the oval displacement path. Therefore, the plurality of work tables can be more firmly supported in a manner capable of displacement along the oval displacement path.

According to the fourth aspect, the plurality of work tables are also supported by the traveling portion traveling over the travel support. Therefore, the plurality of work tables can be more firmly supported in a manner capable of displacement along the oval displacement path.

According to the fifth aspect, the traveling portions of the plurality of work tables travel over the travel support, which is in a position above the floor surface. Therefore, running over a component when displacing the work tables can be more reliably inhibited.

According to the sixth aspect, the control panel is fixated on the inner peripheral side of the oval displacement path and above the top end position of the plurality of work tables. Therefore, an installation space for the plurality of work tables can be made as small as possible.

According to the seventh aspect, a component supplied for assembly work on the work table can be inhibited from infiltrating below the work table by the part chock.

MODE FOR CARRYING OUT THE INVENTION

Figure 1:
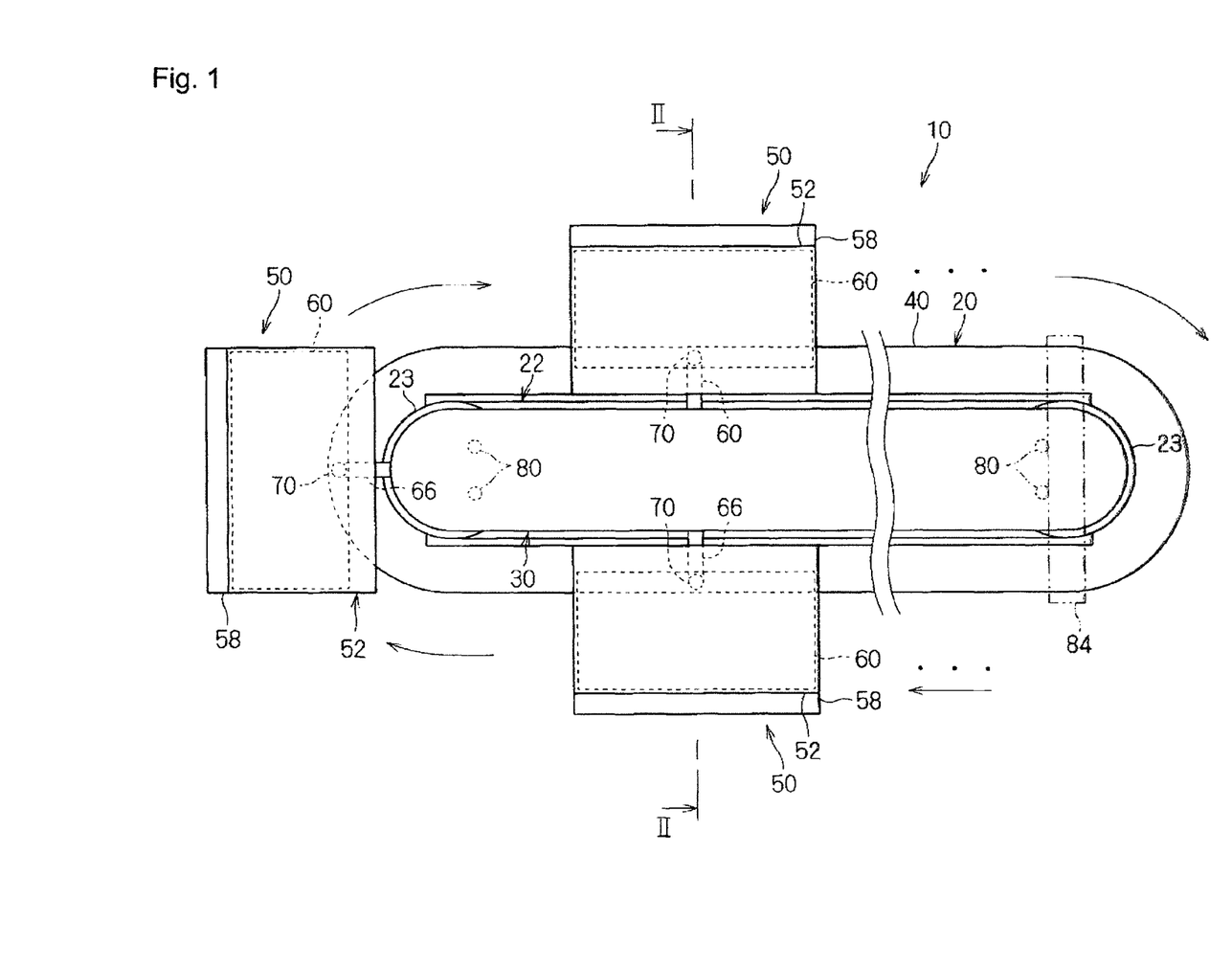
FIG. 1 is a schematic plan view illustrating an overall configuration of an assembly work conveyor device according to an embodiment.
Figure 2:
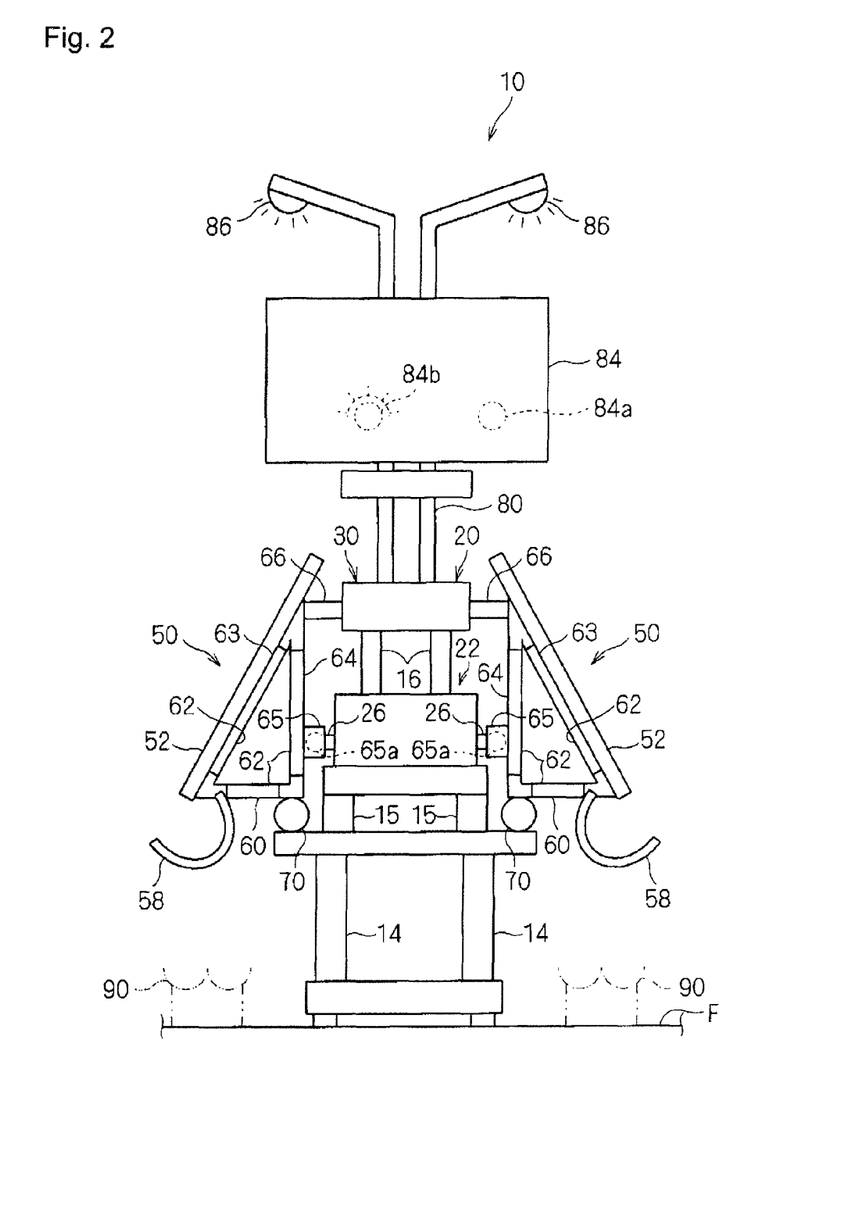
FIG. 2 is a schematic cross-sectional view along a line II-II in FIG. 1.

Hereafter, a description is given of an assembly work conveyor device according to an embodiment. FIG. 1 is a schematic plan view illustrating an overall configuration of the assembly work conveyor device, and FIG. 2 is a schematic cross-sectional view along a line II-II in FIG. 1.

An assembly work conveyor device 10 includes a plurality of work tables 50 and a displacement support mechanism 20. The plurality of work tables 50 are circulatingly displaced along an oval displacement path by the displacement support mechanism 20. In the present embodiment, a description is given with an assumption that the work tables 50 assemble a wire harness to be mounted in a vehicle or the like. Under these circumstances, "wire harness" refers to a structure in which a plurality of electrical wires are bundled together while branching appropriately as needed in a format matching a wiring pathway in the vehicle or the like. The wire harness is manufactured through a plurality of operations, such as an operation of laying the plurality of electrical wires in order so as to match the wiring pathway, an operation of bundling each portion, and the like. By displacing the work tables 50 in order in front of a plurality of workers, a plurality of operations are performed in order on each of the work tables 50 to manufacture the wire harness. However, the work table 50 is not limited to a case of assembling a wire harness and can be used in the manufacture of various manufactured articles produced through a plurality of operations.

A more concrete description is given for each component.

The work table 50 includes a work board 52 and a work table main body 60.

The work table main body 60 is formed by a pole-shaped member 62 made of metal or resin being assembled in a frame shape using a joint member and the like. Herein, the work table main body 60 is assembled so as to form a transverse triangular column. A height dimension of the work table main body 60 is smaller than a height dimension of a work table fixated in a posture described hereafter, while a depth dimension of the work table main body 60 is smaller than a dimension in the same direction of the work table 50 fixated in the same inclined posture. The pole-shaped member 62 is provided at least to portions corresponding to each leg of the triangular column, and is provided to other portions according to strength requirements and the like. A portion of the work table main body 60 oriented toward an outer periphery of the oval displacement path in a state supported by the displacement support mechanism 20 is formed on an inclined portion 63 inclined downward and toward the outer periphery. The work table 50 is attached to the inclined portion 63. In addition, a back 64 of the work table main body 60 faces an inner periphery of the oval displacement path in a state supported by the displacement support mechanism 20 and is formed so as to extend along a vertical direction. The work table 50 is supported by the displacement support mechanism 20 via a portion on the back 64 side.

Moreover, in the present embodiment, the work table main body 60 is formed by assembling the pole-shaped members 62. However, this is not necessarily required. The work table main body 60 may instead partially or entirely use plate members, box frame members, and the like.

The work board 52 is a board for assembling the wire harness. Herein, a brace for supporting the wire harness is provided projecting on the work board 52 along a path where the wire harness is laid. Envisioned examples of the brace include a jig having a portion with a U-shaped top end, a jig having an "L" shape or an "I" shape for positioning, and the like.

The work board 52 is attached and fixated to the inclined portion 63 of the work table main body 60 in a posture inclined downward toward the outer periphery of the oval displacement path. Thereby, the work board 52 can be provided to each worker positioned on the outer peripheral side of the oval displacement path, the work board 52 being provided in a posture inclined so as to increase in height further from the worker. Moreover, fixation of the work board 52 and the work table main body 60 can be performed by screw-fixation, fixation via, e.g., a metal piece, and the like. An angle of inclination of the work board 52 with respect to a floor surface is preferably increased as much as possible within a range not interfering with the work (for example, 75°). Accordingly, space occupied by the work table 50 in a plan view is reduced as much as possible and an installation area of the assembly work conveyor device 10 can be made as small as possible.

In addition, a part chock 58 is provided to an end of the work table 50 on the outer peripheral side of the oval displacement path. The part chock 58 is a member formed from resin and the like, or a member formed from a pair of pole-shaped members and a film member bridging the pole-shaped members, and the like. The part chock 58 is formed to be a member having substantially a "U" shape in lateral cross-section. In addition, the part chock 58 is attached and fixated to the end of the work table 50 on the outer peripheral side of the oval displacement path in a state where a trough portion thereof is positioned below a lower edge of the work board 52. Further, the part chock 58 catches an electrical wire and the like sagging from the surface of the work board 52 and inhibits the electrical wire and the like from infiltrating below the work table 50, and in particular inhibits the electrical wire and the like from being located on a travel path of a caster 70 (described below). However, a part chock is not limited to the above-noted configuration and may have a configuration extending further than the end of the work table 50 on the outer peripheral side of the oval displacement path, and interposing below the outer peripheral end and a portion that reaches the travel path of the caster 70 (described below).

Moreover, the part chock 58 described above is not necessarily provided to all of the work tables 50.

The displacement support mechanism 20 includes a displacement driver 22 displacing the plurality of work tables 50 along the oval displacement path. In addition, the plurality of work tables 50 are circulatingly displaced along the oval displacement path while being supported in a cantilevered manner in a posture projecting toward the outer periphery of the oval displacement path.

Herein, a configuration supporting the work tables 50 in the cantilevered manner in a state capable of being trundled is achieved by a configuration using the displacement driver 22, a configuration using a displacement guide member 30, and a configuration using the caster 70 as a traveling portion attached to the work table 50.

Each of the above-noted configurations is described in order.

Figure 3:
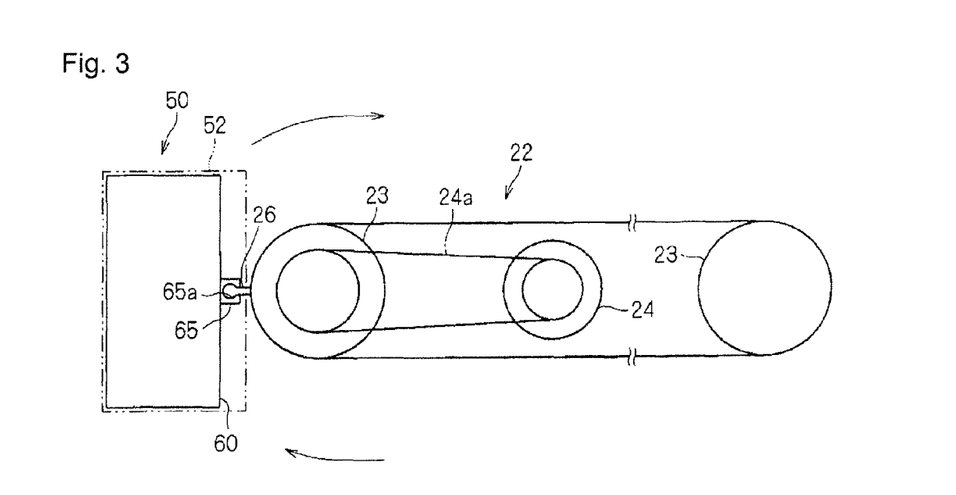
FIG. 3 is a schematic plan view illustrating a displacement driver.
Figure 4:
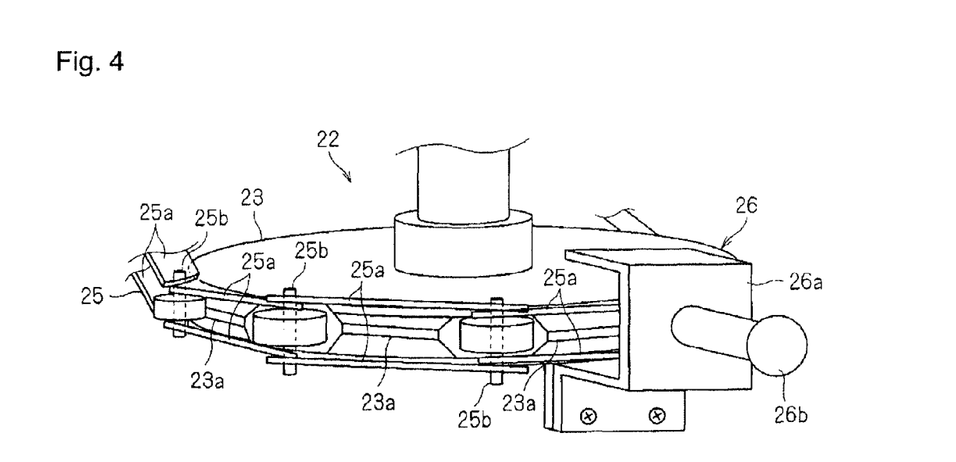
FIG. 4 is a partial schematic perspective view of the displacement driver.

FIG. 3 is a schematic plan view illustrating the displacement driver 22, and FIG. 4 is a partial schematic perspective view of the displacement driver 22. As shown in FIGS. 1 to 4, the displacement driver 22 drives the work table 50 to displace along the oval displacement path and includes a pair of rotating bodies (such as sprockets) 23 installed at both ends of the oval displacement path, a motor 24 driving one of the rotating bodies 23 to rotate, and a chain 25 as an exemplary endless looped member. Projections 23*a* are formed on outer circumferences of the pair of rotating bodies 23 at intervals in a circumferential direction thereof. The projections 23*a* are formed in a shape long in the circumferential direction of the rotating body 23 and gradually tapering toward a forefront end. Further, the chain 25 is a configuration in which a plurality of pairs of plate-shaped connecting members 25*a* are connected in an annular shape via pins 25*b*. The chain 25 is wound around the outer circumference of the pair of rotating bodies 23 in a state where the projections 23*a* of the rotating bodies 23 are positioned between the pairs of plate-shaped connecting members 25*a* and pins 25*b*. In addition, a rotational drive force of the motor 24 is transmitted to one of the rotating bodies 23 via a drive chain 24*a*. Also, one of the rotating bodies 23 is driven to rotate by the rotational drive of the motor 24 and, thus, the chain 25 is driven to circulatingly rotate along the oval displacement path.

Further, work table connectors 26 are provided at intervals to the chain 25. Herein, the work table connectors 26 are attached and fixated to the plate-shaped connecting member 25*a* by screw-fixation and the like at predetermined intervals in an extension direction of the chain 25. The work table connector 26 includes a bracket 26*a* attached and fixated to the plate-shaped connecting member 25*a* and a connecting pole-shaped member 26*b* projecting from the bracket 26*a* toward the outer periphery of the oval displacement path. A forefront end of the connecting pole-shaped member 26*b* bulges in a spherical shape.

In addition, the back 64 of the work table 50 includes a connection receiver 65 capable of connecting with the connecting pole-shaped member 26*b*. Herein, the pole-shaped member 62 extending along an up-down direction is provided to a width-direction middle portion of the back 64 of the work table 50, and the connection receiver 65 is provided to a longitudinal-direction middle portion (herein, a portion toward a lower side) of the pole-shaped member 62. The connection receiver 65 is a block-shaped member protruding from the back of the work table 50 toward the inner periphery of the oval displacement path. Further, a connecting trough 65*a* is formed on the connection receiver 65, the connecting trough 65*a* opening upward and toward a back surface (toward the inner periphery of the oval displacement path). The connecting trough 65*a* is formed in a shape corresponding, in a plan view, to a plan view shape of the connecting pole-shaped member 26*b*, i.e., a shape widening on a work table main body 60 side and narrowing at an opening on a rearward side of the work table main body 60 (inner peripheral side of the oval displacement path). Accordingly, by fitting the connecting pole-shaped member 26*b* into the connecting trough 65*a* in a direction following the vertical direction, the connecting pole-shaped member 26*b* is connected to the connection receiver 65 in a retained state. In this state, by circulatingly rotating the chain 25 along the oval displacement path, the work table 50 connected to the chain 25 via the connecting pole-shaped member 26*b* and the connection receiver 65 is driven to displace along the oval displacement path. Further, from this state, by displacing the connecting pole-shaped member 26*b* upward with respect to the connection receiver 65, the connecting pole-shaped member 26*b* is removed from the connecting trough 65*a*. In this way, the connecting pole-shaped member 26*b* is detachably connected to the connection receiver 65.

Figure 5:
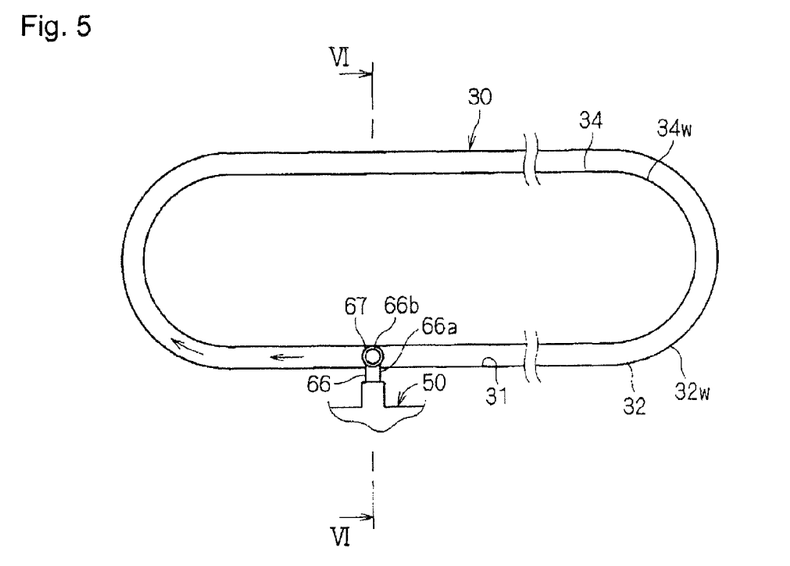
FIG. 5 is a schematic plan view illustrating a displacement guide member.
Figure 6:
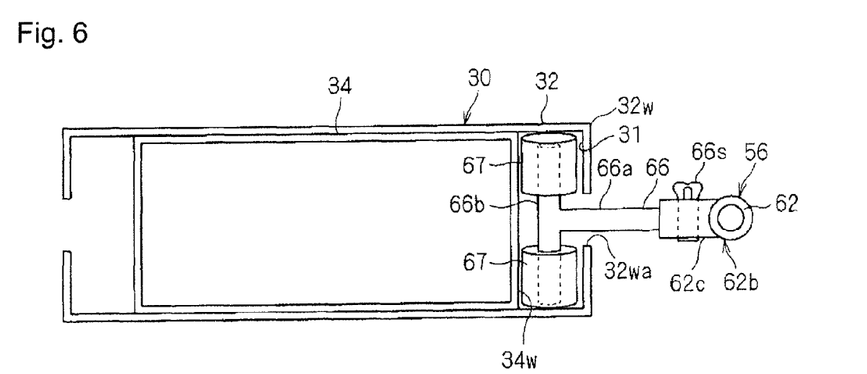
FIG. 6 is a schematic cross-sectional view along a line VI-VI in FIG. 5.

FIG. 5 is a schematic plan view illustrating the displacement guide member 30, and FIG. 6 is a schematic cross-sectional view along a line VI-VI in FIG. 5.

As shown in FIGS. 1, 2, 5, and 6, each of the work tables 50 includes a displacement support 66 protruding toward the inner periphery of the oval displacement path.

The displacement support 66 is a T-shaped member having a support pole main body 66*a* and a roller support pole 66*b*, which is attached in an orthogonal posture to one end of the support pole main body 66*a*. A pair of rollers 67 are rotatably supported on each of two ends of the roller support pole 66*b*.

The displacement support 66 is projectingly provided to the back 64 of the work table 50 in a posture where the pair of rollers 67 are provided along the up-down direction. Herein, the pole-shaped member 62 is provided to a top portion of the back 64 of the work table 50 so as to extend along a width direction thereof, and the displacement support 66 is provided to a longitudinal-direction middle portion of the pole-shaped member 62 so as to extend toward the rear (inner periphery of the oval displacement path). A position where the displacement support 66 is provided is the same in the width direction of the work table 50 as a position where the connection receiver 65 is placed. The displacement support 66 is preferably detachably attached to the work table 50. For example, a configuration may be employed in which the pole-shaped member 62 includes an intermediate connecting member 62*b* having a tube 62*c* extending toward the rear of the work table 50 (inner periphery of the oval displacement path); a support pole main body 66*a* is insertably and removably fitted into the tube 62*c*; and, in addition, in this fitted state, a screw member 66*s* such as a butterfly screw is screwed together and fastened to the tube 62*c* and the support pole main body 66*a*. Accordingly, by loosening and removing the screw member 66*s*, the roller support pole 66*b* and the work table 50 can be separated.

The displacement guide member 30 is configured such that the displacement support 66 is supported in a manner capable of displacement along the oval displacement path. Herein, the displacement guide member 30 is configured to include a guide path 31 guiding the pair of rollers 67 along the oval displacement path. More specifically, the displacement guide member 30 includes a flat housing-shaped outer member 32 having an oval shape in a plan view, and a flat housing-shaped inner member 34 positioned within the outer member 32 and having an oval shape in a plan view. A height dimension of the outer member 32 and the inner member 34 is set to a dimension that is the same as or larger than the up-down direction dimension of the pair of rollers 67. Further, in a plan view, the inner member 34 is formed to a size approximately that of the diameter of the rollers 67 and smaller than that of the outer member 32. Accordingly, in a state where the pair of rollers are positioned along the up-down direction between an inner surface of an outer peripheral wall 32*w* of the outer member 32 and an outer surface of an outer peripheral wall 34w of the inner member 34 in a state where the inner member 34 is positioned within the outer member 32, the guide path 31 is formed capable of guiding the pair of rollers 67 along an oval shape. Moreover, a groove 32wa corresponding to the diameter of the support pole main body 66a of the displacement support 66 is formed on an up-down direction middle portion of the outer peripheral wall 32w of the outer member 32. In a state where the pair of rollers 67 are positioned on the guide path 31, the support pole main body 66a is positioned projecting past the groove 32wa toward the outer periphery of the outer peripheral wall 32w of the outer member 32.

In addition, in a state where the pair of rollers 67 of the displacement support 66 projecting on the back 64 of the work table 50 are positioned on the guide path 31, when the work table 50 is displaced along the oval displacement path, the pair of rollers 67 contact the inner surface of the outer peripheral wall 32w of the outer member 32 or the inner surface of the outer peripheral wall 34w of the inner member 34 to slave rotate while being supported in a manner capable of displacing along the guide path 31. Thereby, the displacement support 66 is supported by the guide path 31 in a manner capable of displacing along the oval displacement path, and the work table 50 connected to the displacement support 66 is supported in a manner capable of displacing along the oval displacement path.

Moreover, a configuration supporting a displacement support in a manner capable of displacing along an oval displacement path is not limited to the above-noted example. For example, a configuration is also possible in which a slider is provided to the displacement support and the slider slide-displaces along a rail having an oval shape.

In addition, herein, the displacement guide member 30 is provided above the displacement driver 22. However, the displacement guide member 30 and the displacement driver 22 may also be provided so as to be reversed in the up-down direction.

Further, as shown in FIGS. 1 and 2, the caster 70 is provided to the work table 50 as a traveling portion.

In other words, the caster 70 is provided to a bottom portion of the work table 50 on the inner peripheral side of the oval displacement path (a bottom portion of the back 64). Herein, the caster 70 is provided to a width-direction center portion of the work table 50.

In addition, the displacement support mechanism 20 includes a travel support 40 positioned along the oval displacement path and supporting the caster 70 at a position above a floor surface F such that the caster 70 is capable of traveling. The floor surface F is a floor surface of a factory and the like, on which the present assembly work conveyor device 10 is placed and on which the workers stand.

More specifically, the plate-shaped travel support 40 is provided projecting at a position below the displacement driver 22, the travel support 40 flaring toward an outer periphery along the oval displacement path. The travel support 40 itself is supported at a position away from the floor surface by a device frame 14. The travel support 40 is positioned below an oval displacement trajectory of the back 64 of the work table main body 60.

In addition, the caster 70 of the work table 50 contacts the travel support 40 from above, and is supported so as to be capable of traveling over the travel support 40. Thereby, a weight of the work table 50 is supported by the caster 70 and the travel support 40.

Moreover, the position of the caster 70 is not necessarily the width-direction center portion of the work table 50. Further, as long as a certain width can be secured as a travel path on which the caster 70 travels, a plurality of the casters 70 may be provided in a width direction of the work table 50. Also, the travel support 40 described above may be omitted and an extended leg extending downward may be provided to the work table 50 and a caster provided to the extended leg. In such a case, the caster may be configured to travel across the floor surface F in contact with the floor surface F. In addition, the caster 70 is not necessarily used as the traveling portion. The traveling portion may also be configured to travel by sliding over the travel support 40.

In addition, the assembly work conveyor device 10 has a support frame 80 provided in an erect manner within the oval travel path. Herein, the displacement driver 22 is fixated on top of the travel support 40 via a first middle frame 15, the displacement guide member 30 is supported on top of the displacement driver 22 via a second middle frame 16, and the support frame 80 stands on top of the displacement guide member 30. An operation panel 84 is attached and fixated to the support frame 80, the operation panel 84 having a power switch 84a of the assembly work conveyor device 10, a speed control knob 84b, and the like. The control panel 84 is provided at a height position past a top end position of the work table 50 so as to not interfere with the work tables 50. However, the control panel 84 may also be attached and fixated to the support frame 80 in a posture matching the width direction of the operation panel 84 to the longitudinal direction of the oval displacement path. An illumination device 86 and the like are also attached to the support frame 80. In other words, devices for operation and control of the assembly work conveyor device 10, devices related to assembly work, or the like are attached to the support frame 80.

In the assembly work conveyor device 10, the weight of the work table 50 is chiefly supported by a configuration in which the caster 70 provided to a bottom portion of the back 64 of the work table 50 travels over the travel support 40 along the oval displacement path. In addition, the work table 50 is guided so as to displace along the oval travel path in an erect posture by a configuration in which the displacement support 66 of the work table 50 chiefly travels on the oval guide path 31 of the displacement guide member 30. Moreover, the work table 50 is driven to displace along the oval travel path by a configuration in which the connection receiver 65 of the work table 50 is connected to the connecting pole-shaped member 26b of the displacement driver 22, which displaces along the oval displacement path. With these configurations, the plurality of work tables 50 are circulatingly rotated and displaced along the oval displacement path.

Moreover, the plurality of work tables 50 can be removed from the displacement support mechanism 20 by loosening the screw member 66s to separate the roller support pole 66b and the work table 50, then separating the connection receiver 65 of the work table 50 and the connecting pole-shaped member 26b of the displacement driver 22.

Further, the plurality of work tables 50 are supported in a cantilevered manner by the displacement support mechanism 20 as described above. Therefore, an empty space is formed below a front portion of the work tables 50 (below the outer peripheral portion of the oval displacement path) on the displacement trajectory of the work tables 50. Thus, a stage 90 (see FIG. 2) on which components awaiting assembly and the like can be placed is provided in the empty space (for example, a gutter-shaped component in which electrical wires are placed and supported, and the like). Then, the worker may take the components or the like out from below the work table 50 and perform the work of assembling the components with respect to the work table 50. Thereby, the empty space can be used efficiently.

According to the assembly work conveyor device 10 configured as described above, the plurality of work tables 50 are supported by the displacement support mechanism 20 in a cantilevered manner in a posture projecting toward the outer periphery of the oval displacement path. Therefore, a space is formed between the floor surface F and a side of the work table 50 on the outer periphery of the oval displacement path. Thus, when the work table 50 is displaced along the oval displacement path, running over components on the floor surface F (e.g., electrical wires and the like sagging from the work board 52, or electrical wires and the like in the area awaiting assembly) is inhibited.

Further, the displacement supports 66 projecting toward the inner periphery of the oval displacement path from the plurality of work tables 50 are supported by the displacement guide member 30 in a manner capable of displacement along the oval displacement path. Therefore, the plurality of work tables 50 can be more firmly supported in a manner capable of displacement along the oval displacement path.

Further, the work table 50 is supported by the caster 70 traveling over the travel support 40. Therefore, the work table 50 can be more firmly supported in a manner capable of displacement along the oval displacement path.

Moreover, the caster 70 travels over the travel support 40, which is above the floor surface F. Therefore, when the work table 50 displaces, running over components on the floor surface F can be more reliably inhibited. Also, thereby, a portion below the work table 50 can be omitted to reduce size and weight. Furthermore, a reduction in the size and weight of the displacement support mechanism 20 for supporting and displacing the work table 50 can also be achieved.

In addition, the control panel 84 is fixated on the inner peripheral side of the oval displacement path and above the top end position of the plurality of work tables 50. Therefore, the installation space for the plurality of work tables 50 can be made as small as possible and the installation space for the assembly work conveyor device 10 can be further reduced.

MODIFIED EXAMPLE

Moreover, the configuration of the caster 70 traveling over the travel support 40 in the above-described embodiment may be omitted, and the work table 50 may be configured so as to be supported in a cantilevered manner by a configuration in which the displacement support 66 of the work table 50 travels over the oval-shaped guide path 31 of the displacement guide member 30 and a configuration in which the connection receiver 65 of the work table 50 is connected to the connecting pole-shaped member 26b of the displacement driver 22, the connecting pole-shaped member 26b displacing along the oval displacement path.

In addition, the configuration of the displacement support 66 of the work table 50 traveling over the oval-shaped guide path 31 of the displacement guide member 30 in the above-described embodiment may be omitted, and the work table 50 may be configured so as to be supported in a cantilevered manner by a configuration in which the caster 70 travels over the travel support 40 and a configuration in which the connection receiver 65 of the work table 50 is connected to the connecting pole-shaped member 26b of the displacement driver 22, the connecting pole-shaped member 26b displacing along the oval displacement path.

Moreover, the configuration of the caster 70 traveling over the travel support 40 and the configuration of the displacement support 66 of the work table 50 traveling on the oval-shaped guide path 31 of the displacement guide member 30 may be eliminated and the work table 50 may be configured so as to be supported in a cantilevered manner by the displacement support mechanism 20.

Moreover, each configuration described in the above-noted embodiment and various modified examples can be combined as appropriate to the extent that such combination is not mutually contradictory.

The present invention has been described in detail above; however, the above description is in all respects illustrative and the present invention is not limited to the above description. Numerous modifications not named as examples are understood to be conceivable without deviating from the scope of the present invention.

The invention claimed is:

1. An assembly work conveyor device comprising:
a plurality of work tables; and
a displacement support mechanism that includes a displacement driver causing the work tables to displace along an oval displacement path, wherein
the plurality of work tables are supported in a cantilevered manner by the displacement support mechanism and in a posture projecting toward an outer periphery of the oval displacement path, and wherein
the work tables are cantilevered such that upper surfaces of the worktables are slanted downwardly in a direction from an inner periphery of the work conveyor device towards an outer periphery of the work conveyor device.

2. The assembly work conveyor device according to claim 1, wherein the displacement driver includes an endless looped member driven to circulatingly rotate along the oval displacement path, and
the plurality of work tables are connected to the endless looped member and are thereby driven to displace along the oval displacement path.

3. The assembly work conveyor device according to claim 1, wherein the plurality of work tables include a displacement support projecting toward the inner periphery of the oval displacement path, and
the displacement support mechanism further includes a displacement guide member supporting the displacement support in a manner capable of displacing along the oval displacement path.

4. The assembly work conveyor device according to claim 1, wherein a traveling portion capable of traveling while supporting a weight of one of the plurality of work tables is provided on a bottom portion of each of the plurality of work tables on an inner peripheral side of the oval displacement path.

5. The assembly work conveyor device according to claim 4, wherein the displacement support mechanism is provided along the oval displacement path and further includes a travel support at a position above a floor surface, the travel support supporting the traveling portion in a manner capable of displacement.

6. The assembly work conveyor device according to claim 1, wherein the assembly work conveyor device further comprises:
an operation panel fixated on the inner peripheral side of the oval displacement path and above a top end position of the plurality of work tables.

7. The assembly work conveyor device according to claim 1, wherein a part chock is provided to at least one of the plurality of work tables, the part chock extending further than an end portion of the work table on an outer peripheral side of the oval displacement path and inhibiting a component supplied for assembly work on the work table from infiltrating below the work table.

* * * * *